United States Patent [19]

Morimoto et al.

[11] Patent Number: 5,379,424
[45] Date of Patent: Jan. 3, 1995

[54] DISTRIBUTED DATABASE MANAGEMENT SYSTEM FOR RETRIEVING DATA FILES FROM DATABASES SELECTED BASED UPON RETRIEVAL TIME

[75] Inventors: Yojiro Morimoto; Koichi Sekiguchi; Miho Muranaga; Nobuhiro Kato, all of Kanagawa, Japan

[73] Assignee: Kabushiki Kaisha Toshiba, Tokyo, Japan

[21] Appl. No.: 60,506

[22] Filed: May 12, 1993

Related U.S. Application Data

[63] Continuation of Ser. No. 698,119, May 10, 1991, abandoned.

[30] Foreign Application Priority Data

May 10, 1990 [JP] Japan .................................. 2-118553

[51] Int. Cl.⁶ ........................ G06F 15/40; G06F 15/16
[52] U.S. Cl. .............................. 395/600; 364/DIG. 1; 364/282.4; 364/974.7; 364/963.2
[58] Field of Search ................... 364/DIG. 1, DIG. 2; 395/600

[56] References Cited

U.S. PATENT DOCUMENTS

| | | | |
|---|---|---|---|
| 4,396,984 | 8/1983 | Videki, II | 364/200 |
| 4,531,186 | 7/1985 | Knapman | 364/300 |
| 4,635,189 | 1/1987 | Kendall | 364/200 |
| 4,769,772 | 9/1988 | Dwyer | 364/300 |
| 4,803,614 | 2/1989 | Banba et al. | 364/200 |
| 4,811,199 | 3/1989 | Kuechler et al. | 364/200 |
| 4,829,427 | 5/1989 | Green | 364/300 |
| 4,956,774 | 9/1990 | Shibamiya et al. | 364/200 |
| 5,012,405 | 4/1991 | Nishikado et al. | 364/200 |
| 5,043,872 | 8/1991 | Cheng et al. | 364/200 |
| 5,091,852 | 2/1992 | Tsuchida et al. | 395/600 |

OTHER PUBLICATIONS

Distributed Query Processing Optimization Objectives, Bodorik et al, 4th Int. Conf. on Data Eng., 1–5 Feb. 1988, pp. 320–329, IEEE Pub.
Cyclic Query Processing in Object–Oriented Databases, Kim et al 5th Int. Conf. on Data Eng., 6–10 Feb. 1989, IEEE Pub., 564–571.
An Evaluation of Text Access Methods, Bertino et al, 22nd Hawaii Intern. Conf. on System Sciences, 3–6 Jan. 1989, IEEE Pub, pp. 810–819.
Adaptive Algorithms for Balanced Multidimensional Clustering, Yu et al. 4th Int. Conf. on Data Eng., 1–5 Feb. 1988, pp. 386–393, IEEE Pub.
Indexing Techniques for Queries on Nested Objects, Bertino et al, IEEE Transac. on Knowledge and Data Engr., vol. 1 No. 2, Jun. 1989, pp. 196–214.

*Primary Examiner*—Gareth D. Shaw
*Assistant Examiner*—Lucien Toplu
*Attorney, Agent, or Firm*—Finnegan, Henderson, Farabow, Garrett & Dunner

[57] ABSTRACT

A distributed database management system includes a plurality of computers, each including a database for storing data files to be processed. The plurality of computers are interconnected by communication lines. Each computer has stored data file names, and corresponding address area and location information for all databases, and measures data file retrieval time from the databases. A retrieval time memory section stores data file retrieval times corresponding to the address areas of data stored in the databases. A retrieval time prediction section retrieves the data file retrieval times for data files corresponding to a data file name requested by a user when the requested data file is stored in at least two databases, utilizing stored data file retrieval times and corresponding address areas and location information on where the data file is stored. A data retrieval optimization section selects the database location information and the address area associated with the requested data file name according to the retrieval result by the retrieval time prediction section, and retrieves the requested data file from the appropriate database according to the location information and address area. The system can also register input data files according to a desired retrieval time.

5 Claims, 6 Drawing Sheets

| DATA NAME | ADDRESS AREA | LOCATION INFORMATION (DATABASE) |
|---|---|---|
| L | 0~9999 | B |
| M | 10000~19999 | B |
| N | 20000~29999 | B |
| "EMPTY" | 30000~39999 | B |
| O,P,Q | 40000~49999 | A |
| "EMPTY" | 50000~59999 | A |
| "EMPTY" | 60000~69999 | A |
| ⋮ | ⋮ | ⋮ |
| "EMPTY" | 110000~119999 | C |
| L' | 120000~129999 | C |

Fig. 5.

| ADDRESS AREA | DATA RETRIEVAL TIME (μs) |
| --- | --- |
| 0~9999 | 25000 |
| 10000~19999 | 20000 |
| 20000~2900 | 500 |
| 30000~39999 | 150000 |
| 40000~49999 | 3000 |
| 50000~69999 | 100000 |
| 60000~69999 | 200000 |
| ⋮ | ⋮ |
| 110000~119999 | 300000 |
| 120000~129999 | 500000 |

Fig.6.

DISTRIBUTED DATABASE MANAGEMENT SYSTEM FOR RETRIEVING DATA FILES FROM DATABASES SELECTED BASED UPON RETRIEVAL TIME

This is a continuation, of application Ser. No. 07/698,119, filed May 10, 1991, now abandoned.

BACKGROUND OF THE INVENTION

1. Field of the Invention

The present invention relates to a distributed database management system for retrieving and registering data effectively.

2. Description of the Background

Recently, distributed database systems have been developed to use cooperatively distributed databases. Such distributed database systems have a plurality of computers, which are interconnected by communication lines. Each of the computers includes a database. (Each computer typically is called "site")

It is assumed that three computers A, B, and C are interconnected and include databases A, B, and C, respectively. When a data operation request is supplied to computer A through an input device, computer A checks which database includes the necessary data for the operation request. Each computer has previously had a table stored therein, including the name and location information of all data for databases A, B, and C. If the necessary data is included in database A, computer A processes the request using that data. If the necessary data is included in database B, computer A sends the data request signal to computer B. After receiving the necessary data from computer B, computer A processes the data. If the necessary data is included in database A and computer A is busy with another operation, computer A sends the necessary data and operation request signal to computer B or C. Upon receiving the operation request signal, computer B or C processes the data by using the necessary data received from computer A. Then, computer B or C sends the operation result to computer A.

In this way, in the distributed database system, if the computer is busy when the data operation request is supplied, the computer requests another computer to process the data. Accordingly, the load of each computer can be distributed.

As mentioned above, if computer A is busy and includes the necessary data in database A, computer A must send the operation request signal and the necessary data to computer B or C. Because the necessary data must be sent to the other computer through a communication line with the operation request signal, traffic on the communication line becomes heavy. Therefore, data which is repeatedly used or data which must be more reliable (for example, a bank account balance) is copied into plural databases. In the above example, the reliable data in database A would have been previously copied into database B. Accordingly, if computer A is busy, computer A must send only request operation signals to computer B. After receiving the request operation signal from computer A, computer B processes the data by using the necessary data in database B.

In the following example, it is assumed that a data request signal is supplied to the computer C and computer C decides that all necessary data for the operation is included in both database A and database B. In the prior art, during manufacture of the distributed database system the order in which computer C would request data from another computer was fixed. For example, it may be predetermined that computer C sends a request to computer A when the necessary data is included in both database A and database B. However, it is not necessarily true that the time to send the data from computer A to computer C is shorter than the time to send the data from computer B to computer C. After design of a distributed database system, it often happens that input/output devices or disk apparatus are connected to a specific computer in the distributed database system. In addition, because of the process situation at a given time, it often happens that one computer is busy while another computer is free. As a result, the particular computer in a system that may be able to send the data fastest is changeable continuously. In the prior art, when one computer supplied with a data request signal by a user must obtain the data from another computer, and the desired data is stored in a plurality of other databases, the data request signal is sent only in accordance with the pre-arranged order, without regard to the time of transmission or the processing state of the other computers.

Accordingly, it is one object of the present invention to provide a distributed database management apparatus which can retrieve data for use by one computer from another of a plurality of computers based on which computer can send the data faster.

It is another object of the present invention to provide a distributed database management apparatus which can register data from one of a plurality of computers to another of the plurality of computers based on which computer can retrieve the data according to a desired retrieval time.

Additional objects and advantages of the invention will be apparent from the description which follows, or may be learned by practice of the invention.

SUMMARY OF THE INVENTION

These and other objects of the present invention are accomplished by a distributed database management system having a plurality of interconnected computers, each including a database for processing by the plurality of computers. Each computer includes input means for inputting a data name corresponding to specific data to be processed, the specific data being stored in at least one of the databases; memory management means for storing a plurality of predetermined data names and a corresponding address area and location information for each data name; retrieval time measurement means for measuring a data retrieval time corresponding to the time necessary to retrieve the specific data corresponding to the input data name from one of the databases; retrieval time memory means for storing the data retrieval time measured by the retrieval time measurement means in association with a corresponding address area where the specific data is stored; and selection means for retrieving the specific data to be processed corresponding to the input data name, when the same data is stored in at least two of the databases, from one of the databases containing an address area which is associated with one of the data retrieval times stored in the retrieval time memory means corresponding to the same data name.

Preferably, the selection means includes retrieval optimization means for selecting the location information corresponding to the address area associated with the shortest data retrieval time among the data retrieval times associated with address areas corresponding to the input data name. It is also preferred that the retrieval time measurement means include means for updating the data retrieval time corresponding to the address area based on the data retrieval time retrieved by the selecting means.

The invention also includes a distributed database management system wherein data can be input and stored in combination with a desired retrieval time. In this system, each computer includes input means for inputting of data to be registered and a desired retrieval time; memory management means for storing data names corresponding to the stored data and corresponding address areas and location information for all databases in the system; retrieval time measurement means for measuring data retrieval times corresponding to the time necessary to retrieve data from each database; retrieval time memory means for storing the data retrieval times measured by the retrieval time measurement means in association with the address area of the corresponding data; retrieval time prediction means for locating an address area corresponding to the desired retrieval time in the retrieval time memory means which does not contain stored data; and data retrieval optimization means for selecting the location information in the memory management means corresponding to the address area located by the retrieval time prediction means, and storing the input data in the located address area.

It is preferred that the retrieval time prediction means include means for extracting the data retrieval time associated with an address area stored in the memory management means which does not contain stored data when the desired retrieval time does not coincide with any of the data retrieval times in the retrieval time memory means. In addition, the system may include output means for outputting the data retrieval time extracted by the retrieval time prediction means, to allow the user to select the outputted data retrieval time as a desired retrieval time. The data retrieval optimization means also may include means for storing in the memory management means a data name corresponding to the input data in association with the located address area where the input data was stored and corresponding location information, after the input data has been stored in the database.

BRIEF DESCRIPTION OF THE DRAWINGS

The accompanying drawings, which are incorporated in and constitute a part of the specification, illustrate the presently preferred embodiments of the invention, and, together with the description, serve to explain the principles of the invention. Of the drawings:

FIG. 5 is a chart showing an example of the content of the memory management section of the computer of FIG. 2; and FIG. 6 is a chart showing an example of the content of the retrieval time memory section of the computer in FIG. 2.

DESCRIPTION OF THE PREFERRED EMBODIMENTS

Figure 1:
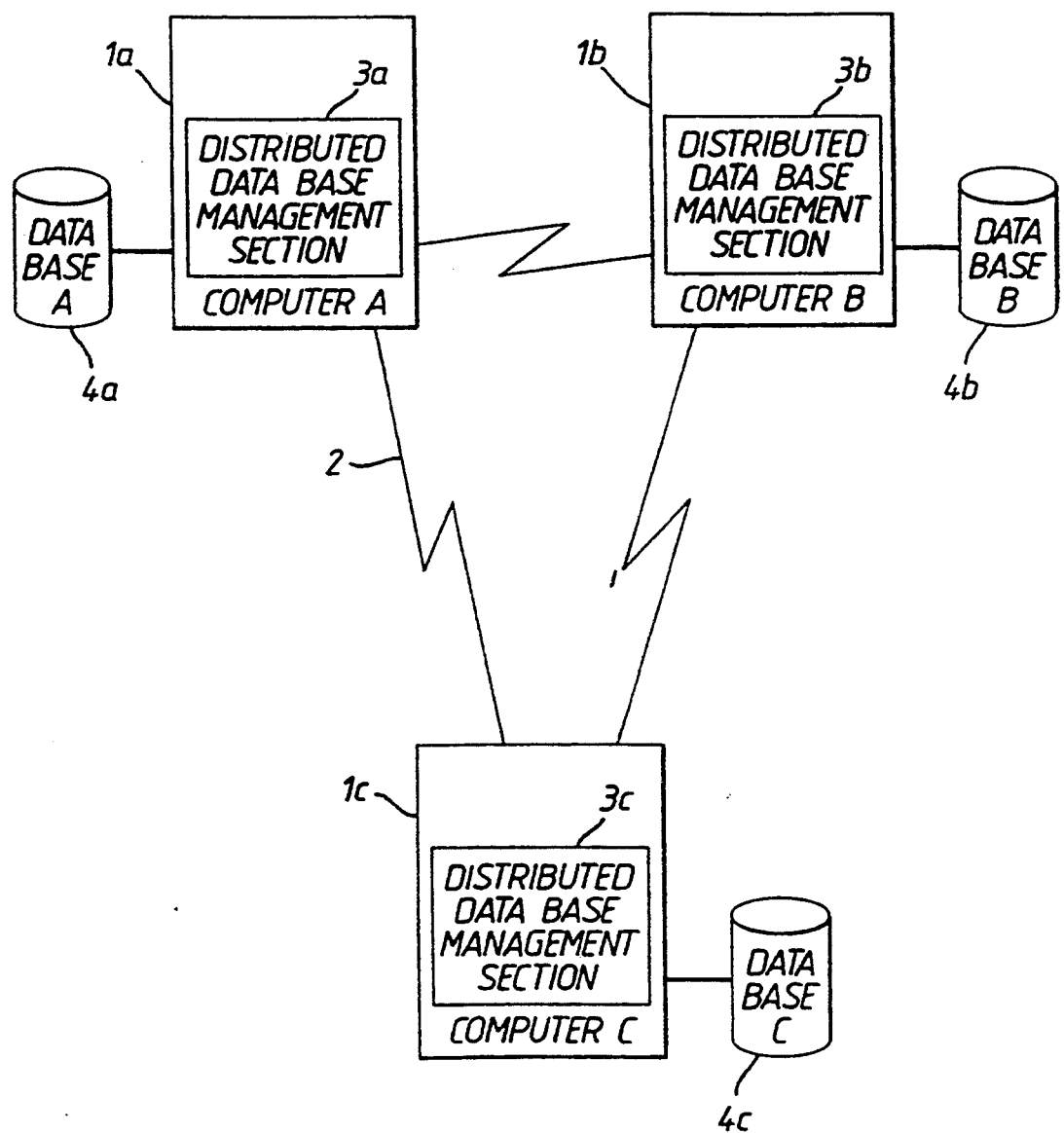
FIG. 1 is a block diagram of a distributed database management apparatus according to the present invention.

Reference will now be made in detail to the present preferred embodiment of the invention, examples of which are illustrated in the accompanying drawings. FIG. 1 is a block diagram of a distributed database management apparatus according to the present invention. In this example, the distributed database management apparatus includes three computers 1a, 1b and 1c, each of which may be, for example, an IBM-Computer (System R*). These computers 1a, 1b and 1c are interconnected by a communication line 2. These computers 1a, 1b and 1c include distributed database management sections 3a, 3b and 3c, respectively, to manage retrieving and registering of distributed data in each computer. In general, these distributed database management sections 3a, 3b and 3c are respectively realized by software, which comprises database management programs in each computer. These computers 1a, 1b and 1c are equipped with databases 4a, 4b and 4c, respectively. The databases 4a, 4b and 4c store data files corresponding to address areas in which the data files are stored.

Figure 2:
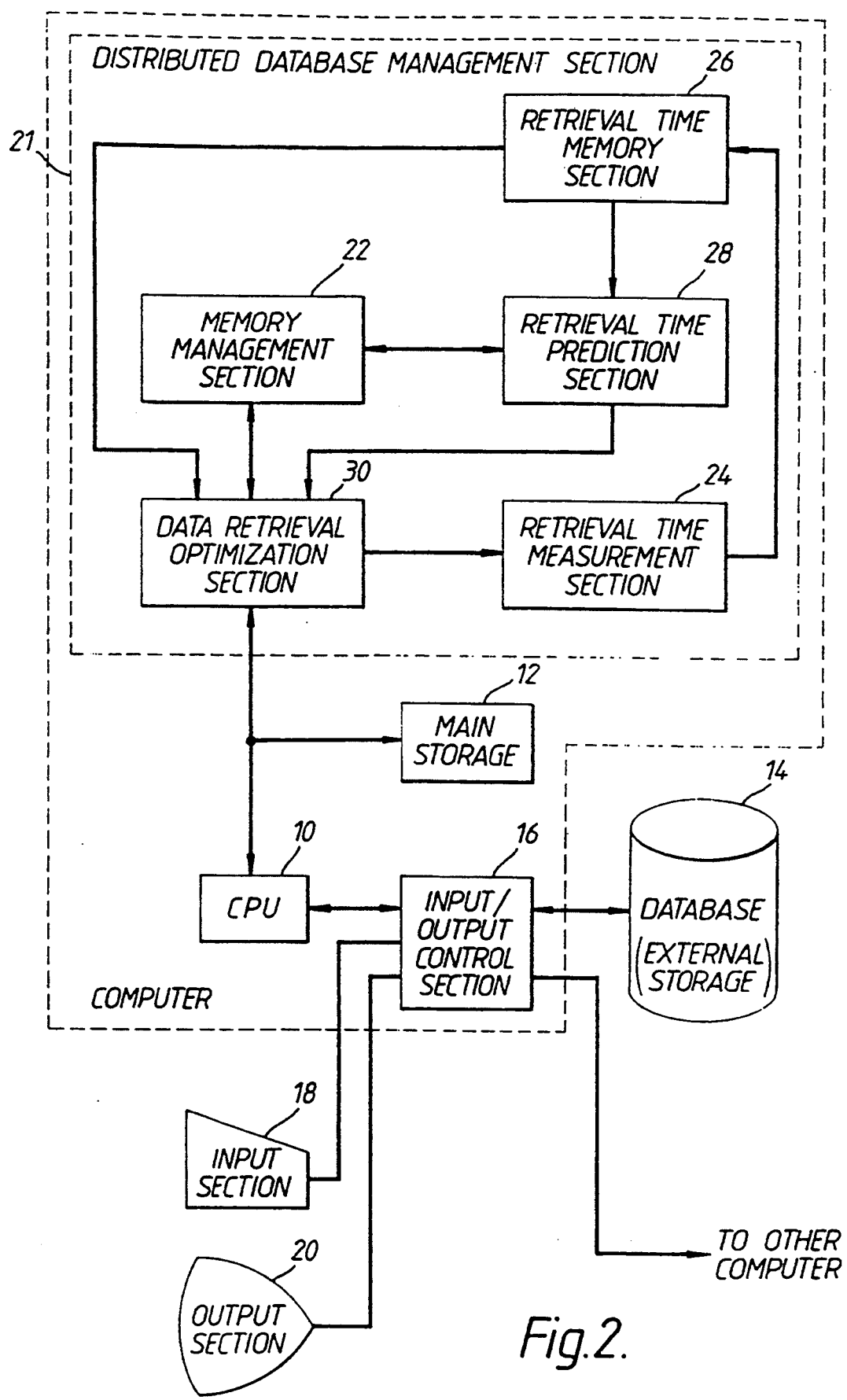
FIG. 2 is a block diagram of a computer of the distributed database management apparatus according to the present invention.

FIG. 2 shows a block diagram of the computer of the distributed database management apparatus of FIG. 1. The computer includes CPU 10, a main storage 12, a database (external storage) 14, an input/output control section 16 and a distributed database management section 21. The input/output control section 16 is connected to an input section (keyboard) 18 for the input of data file name requests by a user, and output section (display) 20 for the display of retrieved data or operation results. The input/output control section 16 is connected to other computers through communication lines 2. The distributed database management section 21 is particularly important to the present invention. This section includes a memory management section 22, a retrieval time measurement section 24, a retrieval time memory section 26, a retrieval time prediction section 28, and a data retrieval optimization section 30. The memory management section 22 stores a data file name and a corresponding address area and location information (database name of the database in which the data file is stored. The retrieval time measurement section 24 measures time in which data files are retrieved from the database in which the data files are stored. The retrieval time memory section 26 stores the time (here in after referred to as the data file retrieval time), measured by the retrieval time section 24, in correspondence with the address area in which the data file whose retrieval time is measured, is stored. Prior to operation, the retrieval time memory section 26 stores the data retrieval times according to test results. Thus, during initialization, this computer experimentally transfers file data from each address area in all databases. The retrieval time measurement section 24 measures the data file retrieval time for each address area and the retrieval time memory section 26 stores the data file retrieval times. In the execute mode, the retrieval time measurement section 24 measures the data file retrieval time corresponding to the data file name request by a user. The retrieval time memory section 26 updates the stored time with the most recent actual data file retrieval time.

When a data file name request is supplied to the computer through the input section 18 by a user, the retrieval time prediction section 28 searches for a data file name, which coincides with the data file name request, in the memory management section 22. If at least two data file names coincide with the data file name request, the retrieval time prediction section 28 retrieves the data file retrieval time of each coincident data file from the data file retrieval times stored in the retrieval time memory section 26, and selects the data file retrieval time of one coincident data file, as the data file retrieval time of the request data file. The data file retrieval optimization section 30 retrieves the location information of the selected coincident data file, as the location information of the requested data file, in the memory management section 22. The data retrieval optimization section 30 retrieves the requested data file from the database through CPU 10, according to the retrieved location information.

Figure 3:
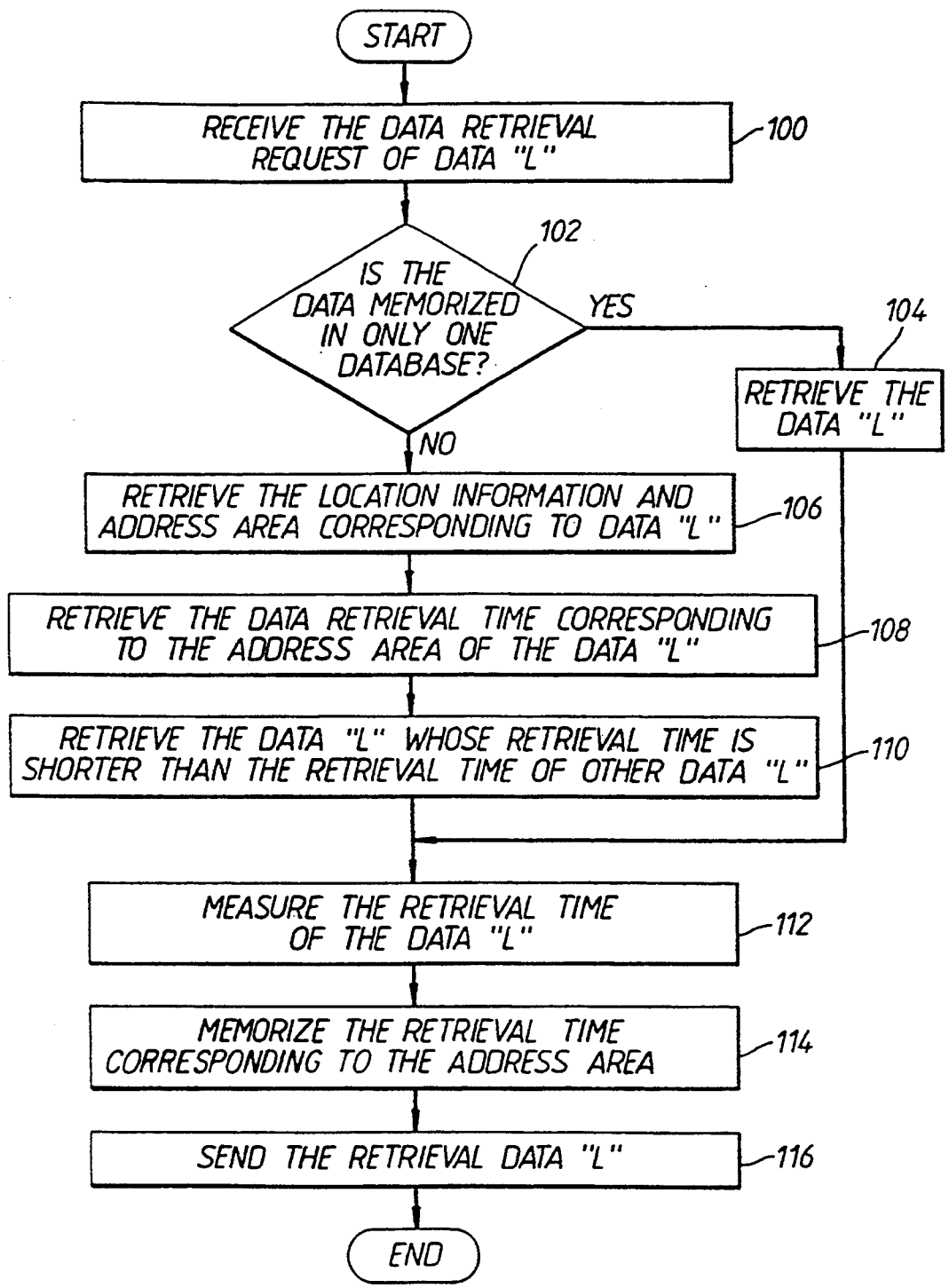
FIG. 3 is a flow chart of the process for retrieving data in the computer of FIG. 2.

Next, the operation of the distributed database management section will be explained in detail. FIG. 3 shows a flow chart of the process for retrieving data files in the computer of FIG. 2. It is assumed that a data file name request of a data file named "L" is supplied to the computer A through the input device (step 100 in FIG. 3). If the data file "L" is stored in one computer's database and a copy of the data file "L" is stored in another computer's database, the computer which was supplied with the data file name request by the user, cannot determine instantly the database from which the data file should be retrieved. Therefore, the computer (the retrieval time prediction section 28) first checks whether the data file "L" is stored in only one database according to the memory management section 22 (step 102 in FIG. 3). If the data file "L" is only stored in one database, the computer (the data retrieval optimization section 30) retrieves the data file, "L" from the database (step 104 in FIG. 3). At that time, the retrieval time measurement section 24 measures the retrieval time and the retrieval time memory section 26 stores the retrieval time corresponding to the address area (described below).

If the data file "L" is stored in at least two databases, the data retrieval optimization section 30 retrieves the location information and the address area corresponding to each coincident data file "L", respectively, from the memory management section 22 (step 106 in FIG. 3). FIG. 5 shows the content of the memory management section 22. The memory management section 22 stores the data file name and its corresponding address area and location information. The address area indicates the storage unit and typically is assigned to each group of ten thousand addresses for all databases. The location information indicates the particular database in which the data file is stored. As shown in FIG. 5, the data file "L" is stored in an address area (0–9999) of the database B (the computer B) and the copied data file "L" is stored in an address area (12000–12999) of the database C (the computer C).

Then the retrieval time prediction section 28 retrieves the data file retrieval time corresponding to each address area of the data file names "L" and "L'" (step 108 in FIG. 3). FIG. 6 shows the content of the retrieval time memory section 26. The retrieval time memory section 26 stores the data file retrieval time corresponding to the address area. As shown in FIG. 6, the data file retrieval time corresponding to the address area (0–9999) of the data file name "L" is 25000 ($\mu$S) and the data file retrieval time corresponding to the address area (12000–12999) of the data file name "L'" is 500000 ($\mu$S).

The retrieval time prediction section 28 receives the two data file retrieval times (25000 ($\mu$S) and 500000 ($\mu$S)) and selects the data file name "L" corresponding to the data file retrieval time 25000 ($\mu$S), because data file "L" is retrieved faster than data file "L'". The section 28 sends the data file name "L" as the prediction result to the data retrieval optimization section 30. The section 30 retrieves the location information and the address area corresponding to the data file name "L" from the memory management section 22. The data retrieval optimization section 30 retrieves the data file "L" according to the address area (0–9999) and the database B through the CPU 10 (step 110 in FIG. 3).

The content shown in FIG. 6 is that of the retrieval time memory section 26 of the computer A. This content indicates the data file retrieval times for computer A. Accordingly, for the computers B and C, the content of the retrieval time memory section is different from the content for computer A.

The data retrieval times shown in the example of FIG. 6 are the latest retrieval times, but, optionally, the data file retrieval times may be as shown below.
 (1) an average time of the retrieval times in the past;
 (2) the maximum retrieval time or the minimum retrieval time in the past;
 (3) a variable retrieval time based on incremental time. For example, the retrieval time may be measured by the hour. If so, according to the present time, the data file retrieval time can be predicted.

In these ways, when the data retrieval optimization section 30 retrieves the data file "L", the retrieval time measurement means 24 measures the retrieval time (step 112 in FIG. 3) and the retrieval time memory section 26 stores the retrieval time corresponding to the address area (0–9999) of the data file "L" (step 114 in FIG. 3). Then, the data retrieval optimization section 30 sends the retrieved data file "L" to the output section 20 through the CPU 10 (step 116 in FIG. 3). The output section 20 displays the data file "L" for the user.

Figure 4:
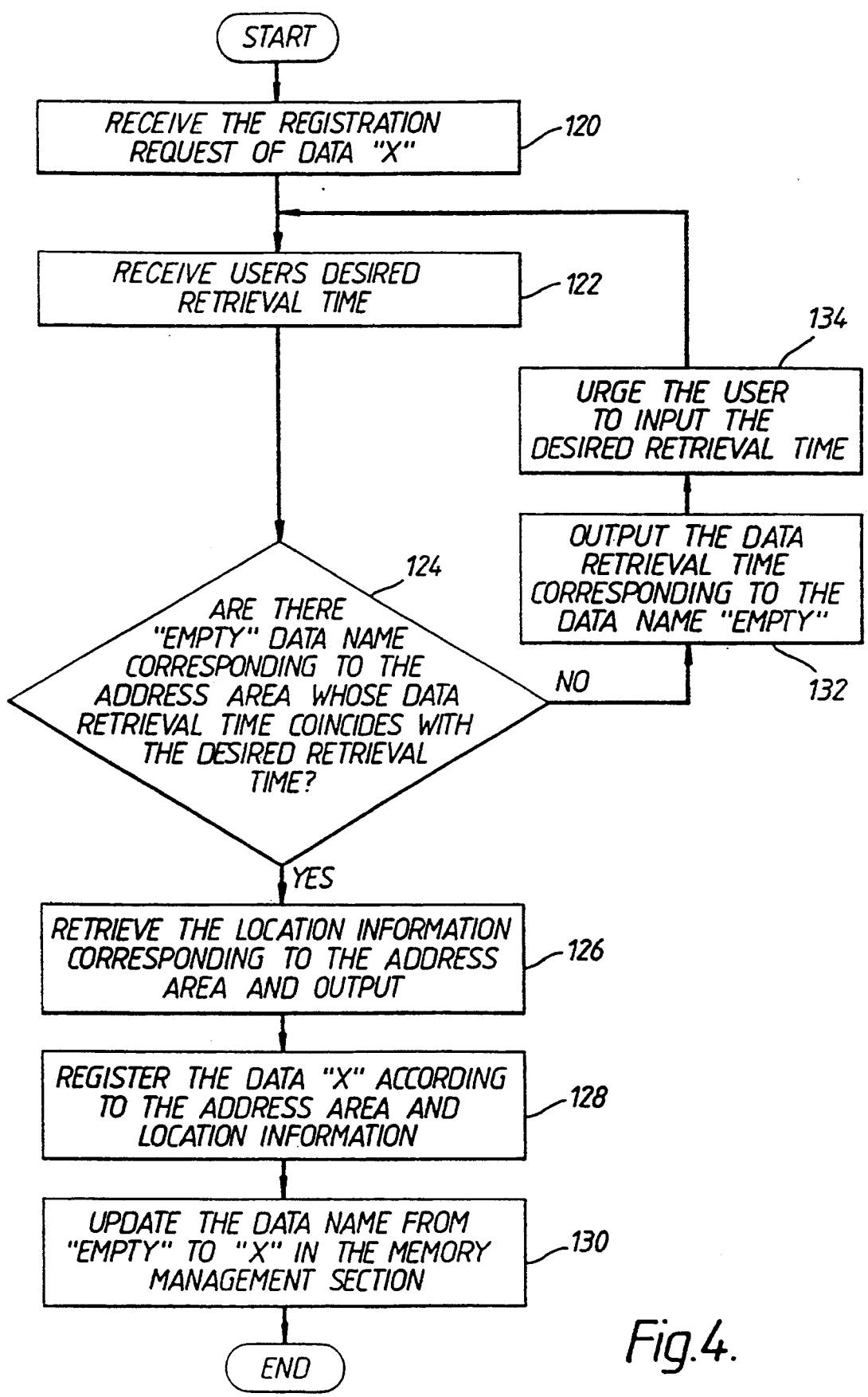
FIG. 4 is a flow chart of the process for registering data in the computer of FIG. 3.

The distributed database management apparatus according to the present invention also can register data files in the most suitable address area in the database. The details of this process are explained as follows. FIG. 4 shows a flow chart of the process of the present invention for registering the data files. First, a registration request (for example, registration data "X") is supplied to the input section 18 by a user (step 120 in FIG. 4). Then, the desired retrieval time or range is supplied to the input section 18 by the user (step 122 in FIG. 4). For example, the user designates the data file named "X" and the desired retrieval time "10000 ($\mu$S)". Alternatively, the user may designate the desired range of the retrieval time (high speed, middle speed, low speed). The retrieval time prediction section 28 retrieves the address area corresponding to the data file retrieval time, which coincides with the desired retrieval time, from the retrieval time memory section 26. In this example, as shown in FIG. 6, the address area "50000–59999" corresponds to the desired retrieval time "100000." Then, the retrieval time prediction section 28 checks whether the data file name, corresponding to the address area which was retrieved, is "empty" or not in the memory management section 22. If the data file name is "empty," the retrieval time prediction section 28 determines the corresponding address area to be registered to registration data "X" and sends the address area to the data retrieval optimization section 30 (step 124 in FIG. 4). In this case, the data file name corresponding to the address area (50000-59999) is "empty". The data retrieval optimization section 30 retrieves the location information corresponding to this address area from the memory management section 22. In this example, the location information corresponding to the address area (50000-599999) is database A. Then, the data retrieval optimization section 30 sends the location information to the output section 20. The output section 20 displays the location information for the user to confirm the particular database to be registered with the registration data (step 126 in FIG. 4). The data retrieval optimization section 30 registers the data file "X" in the address area in the database corresponding to the location information through the CPU 10 (step 128 in FIG. 4). In this case, the section 30 registers the data file "X" to the address area (50000-59999) in database A. Then section 30 updates the data file name from "empty" to "X" in the memory management section 22 (step 130 in FIG. 4). At step 124 in FIG. 4, another method for selecting the "empty" address area to be registered with the data file may be used, as follows.

(1) "empty" address area corresponding to the data file retrieval time, which approximates the desired retrieval time;

(2) "empty" address area corresponding to the data file retrieval time, which is shorter than the desired retrieval time. If there is a plurality of "empty" address areas, the "empty" address area, whose data file retrieval time is the longest among the data file retrieval times of the all "empty" address area should be selected. The other "empty" address areas remain for use when a shorter desired retrieval time is supplied by a user in the future.

During the steps of FIG. 4, if the retrieval time prediction section 28 cannot find the data file name "empty" corresponding to the desired retrieval time, the section 28 retrieves the data file name "empty" and an address area, which does not correspond to the desired retrieval time, from the memory management section 22. Then the section 28 retrieves the data file retrieval time corresponding to the address area and sends the data file retrieval time to the output section 20 through the data retrieval optimization section 30. The output section 20 displays the data file retrieval time corresponding to the data file name "empty" to show the user (step 132 in FIG. 4) and urges the user to select one of the data file retrieval times shown, as the desired retrieval time (step 134 in FIG. 4). After the user selects the data file retrieval time, the process of step 124 is repeated.

Additional advantages and modifications will readily occur to those skilled in the art. The invention in its broader aspects is therefore not limited to the specific details, representative apparatus and illustrative examples shown and described. Accordingly, departures may be made from such details without departing from the scope or spirit of the general inventive concept defined by the appended claims and their equivalents.

What is claimed is:

1. A distributed database management system, comprising:
a plurality of computers, each including a database for storing at least one data file to be processed, each data file being identifiable by a corresponding data file name, and each database being identifiable by a corresponding database name, the plurality of computers being interconnected by communication lines, each computer including:
input means for inputting a data file name of a requested one of the data files to be processed, wherein at least one of a plurality of predetermined data file names corresponds to the requested data file name, the requested data file being stored in at least one of the databases;
memory management means for storing the plurality of predetermined data file names and an address code corresponding to each of the plurality of predetermined data file names, wherein the address code for each predetermined data file name includes a database name of a database in which a data file identifiable by the predetermined data file name, is stored, and an address area identifying the address within each database where the data file is stored;
data file name identification means for identifying which of the plurality of predetermined data file names correspond to the requested data file name;
retrieval time measurement means for measuring a data retrieval time for each data file identifiable by one of the predetermined data file names, wherein a data retrieval time is an amount of time necessary to retrieve a data file from a database in which the data file is stored;
retrieval time memory means for storing each data retrieval time measured by the retrieval time measurement means, and for storing, in association with each data retrieval time, the address area within the database where the data file, whose retrieval time was measured, is stored;
selection means for selecting one of the at least one predetermined data file names which corresponds to the requested data file based upon a comparison of data retrieval times stored in the retrieval time memory means which correspond to the at least one predetermined data file name;
address code identification means for identifying the address code in which the requested data file, as identified by the selected predetermined data file name, is stored; and
retrieving means for retrieving the requested data file from the address area of a database identified by the address code identification means when the requested data file is stored in at least two of the databases, and, when the requested data file is stored in only one database, for retrieving the requested data file from the address area of the one database in which the requested data file is stored,
wherein the selection means includes retrieval selecting means for selecting the one predetermined data file name which has the shortest data retrieval time compared with data retrieval times for retrieving the requested data file from each of the databases in which the requested data file is stored.

2. A distributed database management system, comprising:
a plurality of computers, each including a database for storing at least one data file to be processed, each data file being identifiable by a corresponding data file name, and each database being identifiable by a corresponding database name, the plurality of computers being interconnected by communication lines, each computer including:

input means for inputting a data file name of a requested one of the data files to be processed, wherein at least one of a plurality of predetermined data file names corresponds to the requested data file name, the requested data file being stored in at least one of the databases;

memory management means for storing the plurality of predetermined data file names and an address code corresponding to each of the plurality of predetermined data file names, wherein the address code for each predetermined data file name includes a database name of a database in which a data file identifiable by the predetermined data file name, is stored, and an address area identifying the address within each database where the data file is stored;

data file name identification means for identifying which of the plurality of predetermined data file names correspond to the requested data file name;

retrieval time measurement means for measuring a data retrieval time for each data file identifiable by one of the predetermined data file names, wherein a data retrieval time is an amount of time necessary to retrieve a data file from a database in which the data file is stored;

retrieval time memory means for storing each data retrieval time measured by the retrieval time measurement means, and for storing, in association with each data retrieval time, the address area within the database where the data file, whose retrieval time was measured, is stored;

selection means for selecting one of the at least one predetermined data file names which corresponds to the requested data file based upon a comparison of data retrieval times stored in the retrieval time memory means which correspond to the at least one predetermined data file name;

address code identification means for identifying the address code in which the requested data file, as identified by the selected predetermined data file name, is stored; and retrieving means for retrieving the requested data file from the address area of a database identified by the address code identification means when the requested data file is stored in at least two of the databases, and, when the requested data file is stored in only one database, for retrieving the requested data file from the address area of the one database in which the requested data file is stored, wherein the retrieval time measurement means includes means for updating the data retrieval time stored in said retrieval time memory means which corresponds to the selected predetermined data file name.

3. A distributed database management system, comprising:

a plurality of computers, each including a database for storing at least one data file to be processed, each data file being identifiable by a corresponding data file name, and each database being identifiable by a corresponding database name, the plurality of computers being interconnected by communication lines, each computer including:

input means for inputting a data file to be registered and a retrieval time desired by a user;

memory management means for storing data file names corresponding to a database name of a database in which a data file, identifiable by the data file name, is stored, and an address area identifying the address within each database where the data file is stored;

retrieval time measurement means for measuring a data retrieval time for each data file identifiable by one of the data file names, wherein a data retrieval time is an amount time necessary to retrieve a data file from a database in which the data file is stored;

retrieval time memory means for storing each data retrieval time measured by the retrieval time measurement means, and for storing, in association with each data retrieval time, the address area within the database where the data file whose retrieval time was measured, is stored;

address area locating means for locating an address area corresponding to the desired retrieval time in the retrieval time memory means which does not contain a previously stored data file;

data retrieval selecting means for selecting the database name stored in the memory management means which corresponds to the address area located by the address area locating means;

storing means for storing the input data file at the located address area in the database identified by the selected database name;

wherein the address area locating means includes means for extracting the data retrieval time associated with an address area stored in the retrieval time memory means which does not contain a previously stored data file when the desired retrieval time does not coincide with any of the data retrieval times previously stored in the retrieval time memory means.

4. The distributed database management system of claim 3, further including display means for displaying the data retrieval time extracted by the address area locating means, to allow the user to select the outputted data retrieval time as a desired retrieval time.

5. A distributed database management system, comprising:

a plurality of computers, each including a database for storing at least one data file to be processed, each data file being identifiable by a corresponding data file name, and each database being identifiable by a corresponding database name, the plurality of computers being interconnected by communication lines, each computer including:

input means for inputting a data file to be registered and a retrieval time desired by a user;

memory management means for storing data file names corresponding to a database name of a database in which a data file, identifiable by the data file name, is stored, and an address area identifying the address within each database where the data file is stored;

retrieval time measurement means for measuring a data retrieval time for each data file identifiable by one of the data file names, wherein a data retrieval time is an amount time necessary to retrieve a data file from a database in which the data file is stored;

retrieval time memory means for storing each data retrieval time measured by the retrieval time measurement means, and for storing, in association with each data retrieval time, the address area within the database where the data file whose retrieval time was measured, is stored;

address area locating means for locating an address area corresponding to the desired retrieval time in the retrieval time memory means which does not contain a previously stored data file;

data retrieval selecting means for selecting the database name stored in the memory management means which corresponds to the address area located by the address area locating means;

storing means for storing the input data file at the located address area in the database identified by the selected database name;

wherein the data retrieval selecting means includes means for storing a data file name corresponding to the input data in the memory management means in association with the located address area where the input data was stored after the input data has been stored in the database.

* * * * *